July 23, 1963 J. JEAN-MARIE J. GERIN 3,098,675
SHOCK-RESISTING MOTOR VEHICLES
Filed Sept. 26, 1961 7 Sheets-Sheet 2
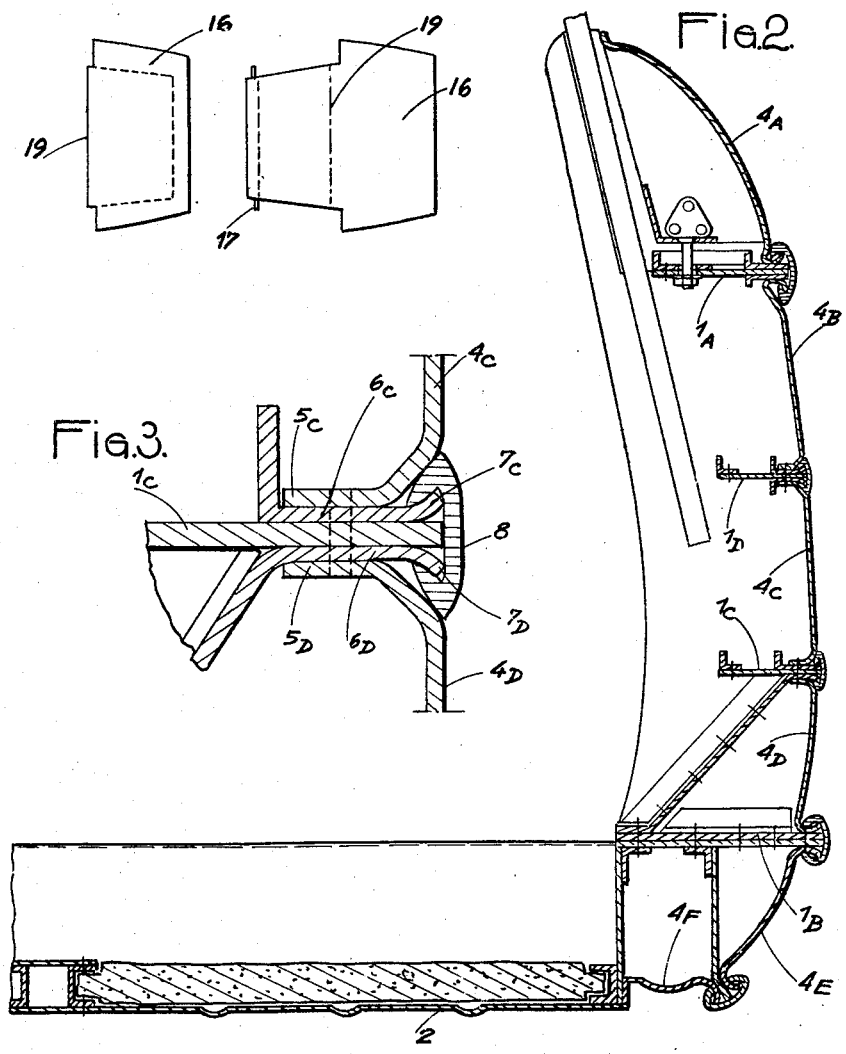

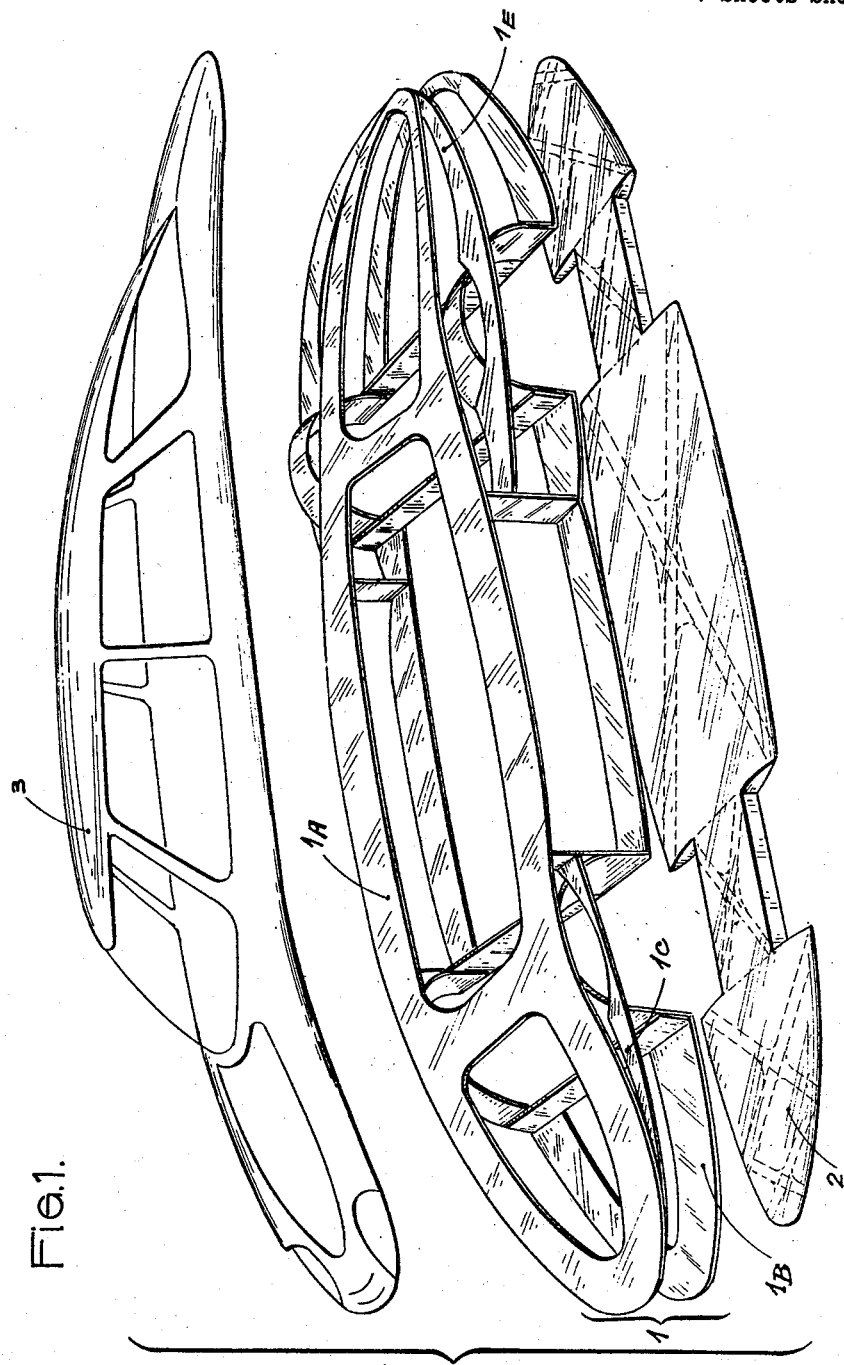

July 23, 1963   J. JEAN-MARIE J. GERIN   3,098,675
SHOCK-RESISTING MOTOR VEHICLES
Filed Sept. 26, 1961   7 Sheets-Sheet 3
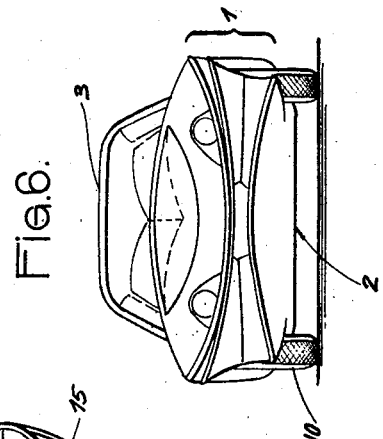
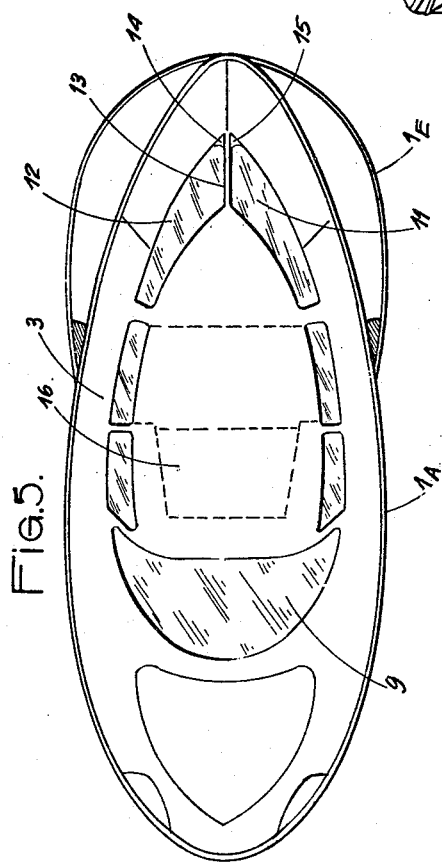
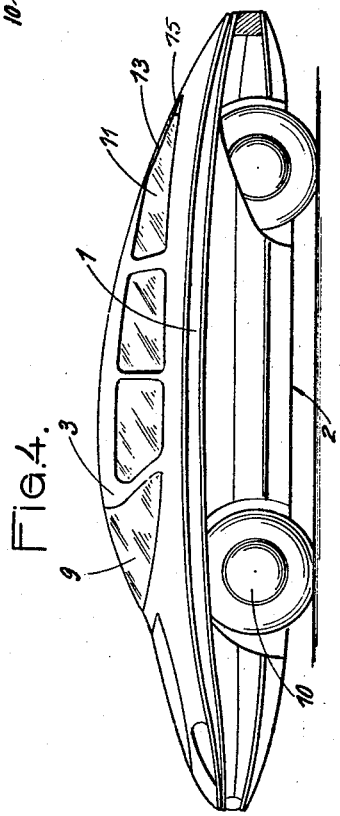

July 23, 1963  J. JEAN-MARIE J. GERIN  3,098,675
SHOCK-RESISTING MOTOR VEHICLES
Filed Sept. 26, 1961  7 Sheets-Sheet 4
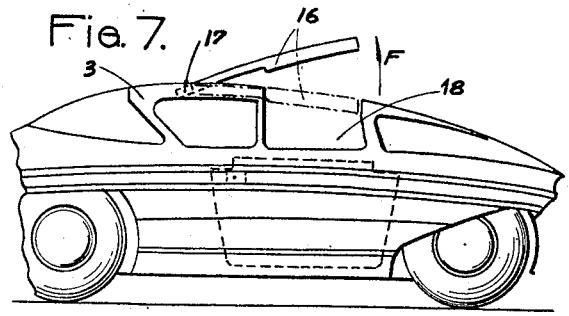
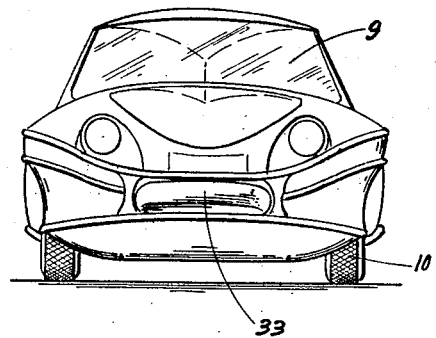
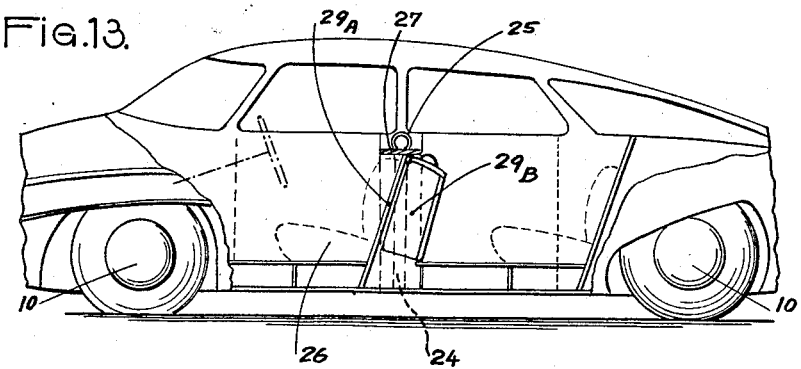
Inventor:
Jacques Jean-Marie Jules Gerin
By [signature]
Attorney July 23, 1963     J. JEAN-MARIE J. GERIN     3,098,675
SHOCK-RESISTING MOTOR VEHICLES
Filed Sept. 26, 1961     7 Sheets-Sheet 5
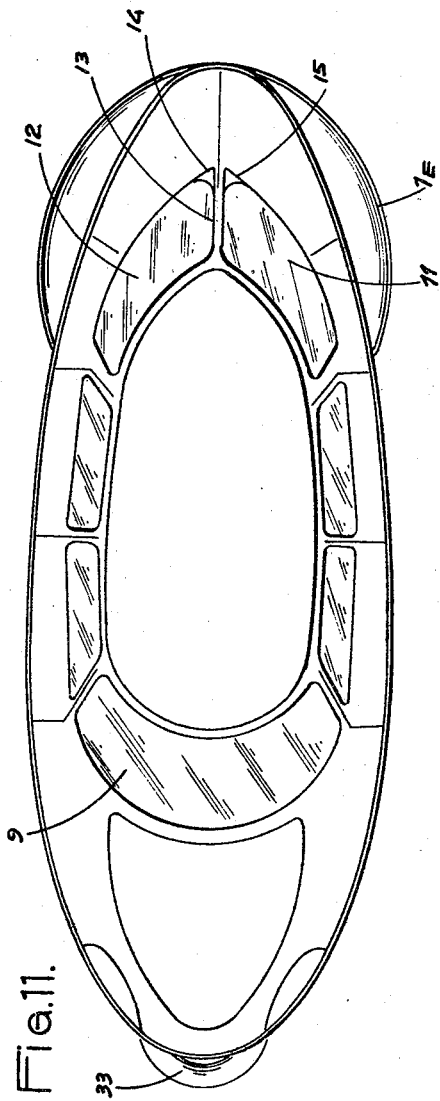
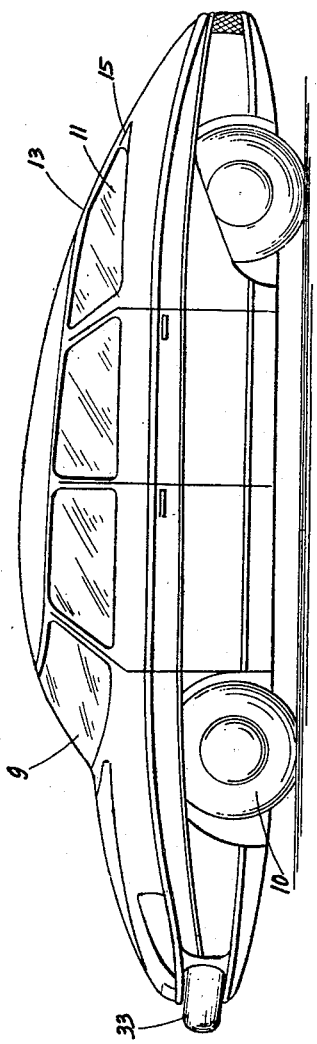

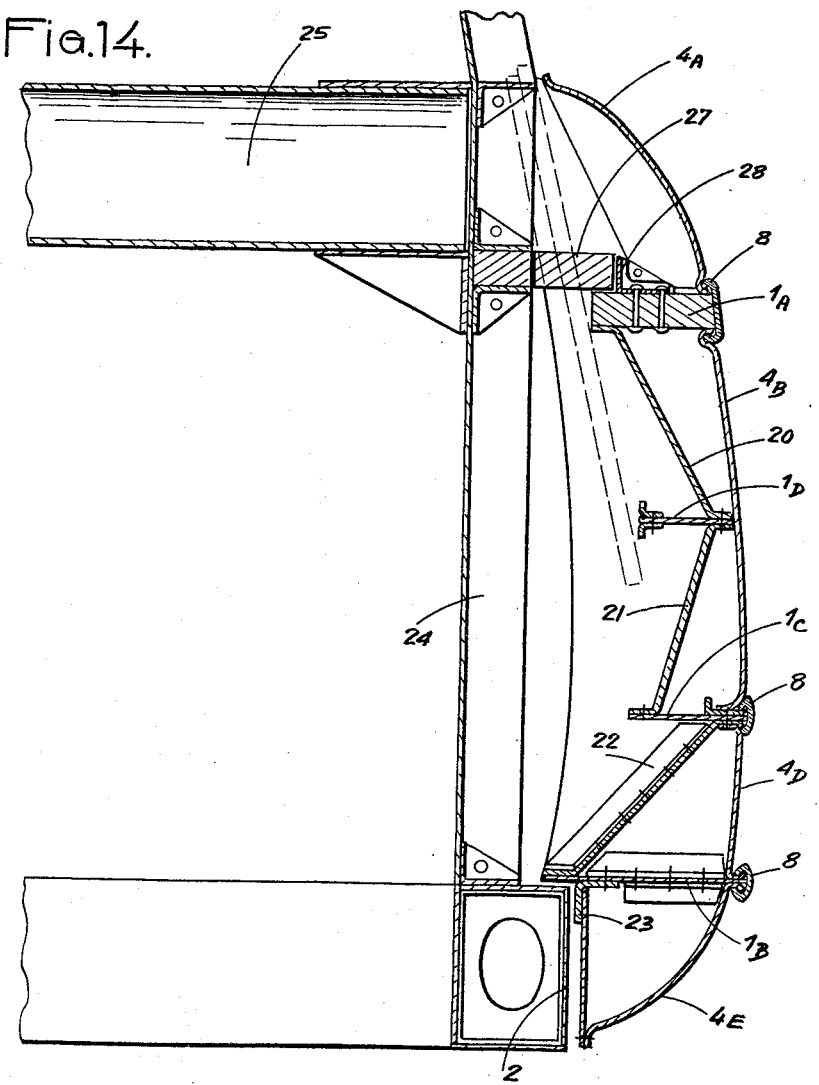

July 23, 1963   J. JEAN-MARIE J. GERIN   3,098,675
SHOCK-RESISTING MOTOR VEHICLES
Filed Sept. 26, 1961   7 Sheets-Sheet 7
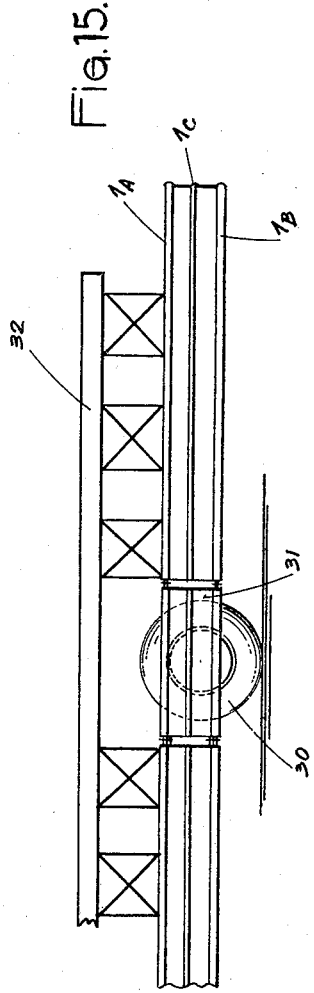
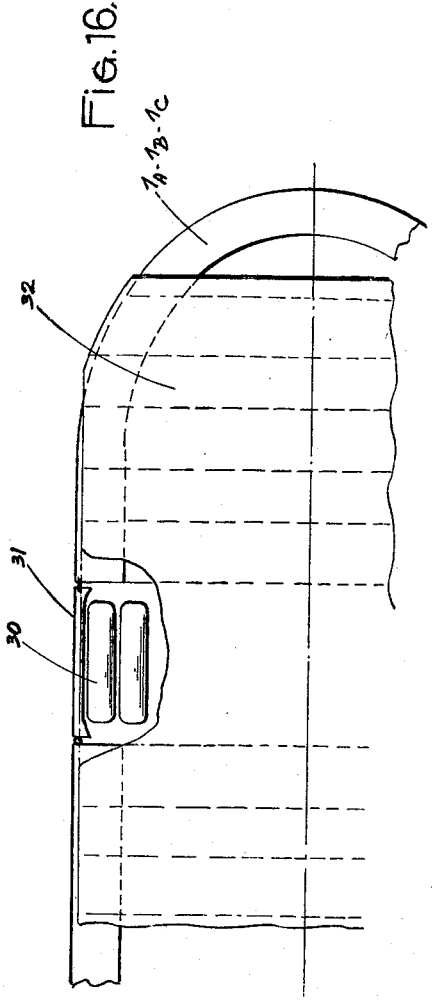

3,098,675
SHOCK-RESISTING MOTOR VEHICLES
Jacques Jean-Marie Jules Gerin, 24 Rue de la Tourelle, Boulogne-sur-Seine, France
Filed Sept. 26, 1961, Ser. No. 140,704
Claims priority, application France Oct. 7, 1960
7 Claims. (Cl. 296—28)

In view of the increasing speeds and the larger number of all kinds of motor vehicles, and also of the constantly increasing number of poor drivers, the frequency and gravity of road casualties are bound to increase at the same rate.

The present invention relates to improvements in motor vehicles, with a view to render them particularly resistant to shocks and thus give the maximum safety to road-users, while minimizing the consequences of all kinds of accidents in which said vehicles might be involved, both as regards the passengers and the vehicles themselves.

These improvements are essentially characterized by the combination of a car body of a conventional material having no particular resistance of its own, and of a both rigid and light protection belt, rendered integral with the said car body in order to provide a self-supporting frame having its maximum strength along the horizontal planes thereof.

The protection belt completely surrounds the vehicle and is, both at the front and at the rear, of a rounded shape so as to cause said vehicle to slide in case of collision with a moving or stationary obstacle.

Said protection belt is constituted by at least one so-called main rib having its maximum strength in the horizontal plane thereof and made integral with the inner structure of the vehicle, said rib acting as a support for the car body.

The main rib is preferably completed by one or more auxiliary ribs positioned one above the other and integral with one another.

The auxiliary ribs and, if desired, the main rib need not be continuous over the entire periphery of the vehicle, provided that wherever one of the members forms a gap, another rib is substituted therefor, whereby the protection belt considered as a whole shows no break in continuity.

The car body proper is advantageously formed of a suitable number of longitudinal strips having the edges thereof secured by riveting, welding or any other suitable means, either intermediate two ribs of the protection belt or intermediate one of said ribs and a structural member of the vehicle.

When the vehicle includes doors, the latter are prevented from distorting by means of a special protection belt, so as to preclude the serious drawback resulting from any improper opening the the doors due to distortions to which they may be subjected in a crash or during an abnormal operation of the vehicle.

In order to further increase the lateral strength of the doors, the movable portions thereof bear, in closed position, on support members integral with a transverse bracing member of the vehicle, which conjugates the resistances of adjacent doors.

The present invention further concerns, as new industrial products, motor-vehicles having some or all of the above-mentioned improvements.

Other features and advantages of the present invention will become clear on reading the following description with reference to the accompanying drawings, showing diagrammatically and merely by way of example, various possible embodiments of the invention, and in which:

FIGURE 1 is an exploded perspective view of the main components of the improvements according to the invention;

FIGURE 2 is an enlarged view of detail, showing in cross-section a car body arranged in accordance with the invention;

FIGURE 3 is an enlarged view of detail, showing the principle of assembly of the various basic components of the car-body illustrated in FIGURE 2;

FIGURES 4, 5 and 6 are an elevation, a plan view and a front view respectively, of a motor-vehicle having a sports car body arranged in accordance with the invention;

FIGURE 7 is an explanatory view of detail showing the possibility of access into the vehicle shown in FIGURES 4, 5 and 6;

FIGURES 8 and 9 are views of detail showing the roof of said vehicle, in extended folded positions, respectively.

FIGURES 10, 11 and 12 are respectively an elevation, a plan-view and a front-view of an alternative embodiment of the invention, as applied to a conventional motor-vehicle;

FIGURE 13 is a sectional elevation showing a detail of the structure;

FIGURE 14 is an enlarged cross-sectional elevation of the arrangement of a door of the vehicle shown in FIGURES 10, 11, 12 and 13;

FIGURES 15 and 16 show the principle of the invention applied to the rear portion of a lorry.

Referring to FIGURES 1, 2 and 3, it will be seen that the principle of the invention as applied to vehicles, comprises the combination, on the one hand, of a car body made of a conventional material (sheet steel, light metal, plastic material, etc.) having no strength of its own and, on the other hand, of a protection device which is both rigid and light.

This protection system is integrated to the car body in such a way that the whole structure constitutes a vehicle having a high impact strength and which nevertheless is not heavier than a normal vehicle with no substantial impact strength. In other words, the present invention provides a car body which is self-resistant to shocks.

More specifically, this self-resistant structure is formed, as will be explained hereafter, with particular reference to FIGURES 1, 2 and 3.

The protection member proper comprises a belt bearing the general reference numeral 1 and completely surrounding the main portion of the vehicle, i.e., the portion comprised between the floor 2 and the roof 3 in the case of a saloon-car. This protection belt should normally be devoid of gaps, highly resistant and rounded both at the front and at the rear of the vehicle so as to cause said vehicle to slide laterally in case of collision with a moving or stationary obstacle and, thus, to preclude a direct hit, or the like, which is generally the more deadly type of accident.

Still more specifically, this protection belt comprises at least one main rib 1A of generally elliptical shape located in a horizontal plane so as to have a very high impact strength in the direction of translation of the vehicle, which precisely is horizontal. This main rib is advantageously completed by one or more auxiliary ribs such as 1B, 1C, 1E adapted to reinforce the former.

Whether these auxiliary ribs extend or not over the entire periphery of the vehicle is immaterial. It will be understood indeed that if the belt is to be interrupted at certain places to accommodate the wheels or allow the opening of the doors, the auxiliary ribs will be provided only where necessary to prevent a break in continuity of the entire protection structure. Thus, in particular, fragmentary auxiliary ribs, such as 1C and 1E in FIGURE 1, can be resorted to.

In order to achieve a structure of the genuine self-supporting body type, both main and auxiliary protection ribs are made integral not only with one another but also with the component members of the vehicle such as for example partition walls, supports and frames for the seatbacks and the seats themselves, adapted to receive cushions, back-rests, foot-rests, dash-board frames, the front axle if possible, the inner mudguards, etc.

The car-body proper comprises, as best seen in FIGURES 2 and 3, longitudinal strips such as 4A, 4B, 4C, 4D, 4E, 4F, secured by riveting, welding or any other suitable means (taking into account the nature of the materials used) either between two protection ribs, as is the case, for example, for strips 4B, 4C and 4D, or between a protection rib and a vehicle component, as is, for example, the case for strips 4E, 4F and 4A.

More specifically (see FIGURE 3), the edges of the longitudinal strips, such as 4C, 4D, are bent so as to be applied at 5C, 5D on two angled brackets 6C, 6D positioned on either side of the corresponding rib i.e. 1C in the present case. This structure is secured together by riveting, welding, or any other suitable means. The ends 7C, 7D of the angled brackets 6C, 6D are bent upwards and downwards respectively, so as to enable a butt-strap 8 to be secured by simple interlocking. Such a butt-strap is not absolutely necessary and one could omit it without falling outside the scope of the invention; in this case, the strips 4C, 4D would be directly secured to the opposite faces of the protection rib 1C.

It will be obvious that the embodiment that has just been described does not limit the invention and that various modifications of detail can be made thereto without falling outside its scope.

The invention essentially comprises a protection structure, with one or more belts providing continuous friction lines and surfaces, without any protrusion liable to catch, along which the stationary or movable obstacles hit by a vehicle will slide without catching onto them or penetrating into them.

Moreover such streamlined, smooth and rounded shapes are particularly favourable to a good penetration into the air and allow the manufacture of streamlined vehicles having a fair appearance as will more clearly appear hereafter.

With reference to FIGURES 4, 5 and 6, concerning a so-called sports car and with reference to FIGURES 10, 11 and 12 concerning a saloon-car, it will be seen that the presence of a plurality of belts entirely surrounding the vehicle enables the passengers to sit more at the front, than in a conventional vehicle, owing to the excellent protection provided to them.

The foregoing provides the possibility, on the one hand, of bringing forward the center of gravity of the vehicle and, on the other hand, of shifting toward the front the whole of the passenger accommodation. The very advanced position of the windshield 9, the lower part of which is located forward of the car's front-axle 10, permits one to obtain a very streamlined vehicle by locating the maximum cross-section within the front third portion of said vehicle, which is the most favourable location for a good flow of air to the rear. In order to prevent air streams from swirling, the rear window panes 11 and 12 are bent laterally so as to meet along an end ridge 13 acting as a tail-fin. The particular shape of the rear window panes 11 and 12 has the additional advantage of allowing a rational flow, without deflections or swirling, of the conditioning air admitted into the vehicle. To this end, adjustable louvres 14 and 15 are provided adjacent the lower end of ridge 13, on either side thereof.

The embodiment of the invention illustrated by way of example in FIGURES 4, 5 and 6, relates to an extremely low sports car with its engine located at the rear. This type of vehicle comprises no conventional doors giving access to the seats, and the protection belt 1 completely surrounds the body of the car. If the vehicle is arranged as a roadster, the access to the seats is not a problem since the passengers have only to stride over the sidewall of the vehicle to reach their seats. On the other hand, if the vehicle is of the sedan-type, the problem of access to the seats can advantageously be solved by the combination of means illustrated in FIGURES 7, 8 and 9. These means include an openable roof 16 characterised in that it is pivotally mounted, at the front-end 17 thereof, on the coach work 3, so as to open as a hood in the direction F. It will thus be seen that to have access to the seats, one has only to cause the roof 16 to pivot forwards, and to lower the side-pane corresponding to the aperture 18.

In order to enable the car to be driven without roof, the pivotal connection 17 is so arranged that, when the roof 16 has been brought to a given position, it can be removed by exerting a simple pull therein. In addition, the roof 16 includes a pivotal connection 19 provided with abutments allowing the user to fold the roof for shifting it from its unfolded state shown in FIGURE 8 to the folded condition of FIGURE 9. Once folded, the roof can be readily housed, at the side of the seat, inside the vehicle, as shown by the dotted line in FIGURE 7.

When the invention is applied to a normal saloon-car, such as shown in FIGURES 10, 11 and 12, and already referred to hereabove, the main problem solved by the applicant is that of the doors.

It is well known indeed that one of the most important sources of road casualties is the ejection of one or several passengers from the vehicles as a result of the opening of the doors after distortion. This distortion can arise from the external shock undergone by the car, or from the fact that the passengers' bodies are projected outwardly or else from the general distortion of the car-body due to somersaulting or to any other abnormal evolution.

The principle of a protection belt consisting of one or several members according to the invention, provides a particularly simple and efficient solution to that important problem by giving the doors a sufficient impact strength to prevent them from being distorted, and therefore opened, for the reasons mentioned in the preceding paragraph.

A possible embodiment concerning this specific case will now be described with reference to FIGURES 13 and 14, it being understood that it does not limit the invention.

Still in accordance with the principle characterizing the invention, each door is provided with its own protection belt consisting of a suitable number of horizontal ribs, viz. in the present instance, two main ribs 1A and 1B, and two intermediate auxiliary ribs 1C and 1D, which form an extension of those of the remaining part of the car body (as clearly shown in FIGURE 10), so that the protection belt as a whole is nowhere interrupted.

These frame members are interconnected by means of suitable cross-pieces such as 20, 21, 22, so as to form a unitary structure having a particularly high resistance in the horizontal direction. As in its other parts, the car body, comprises longitudinal strips 4A, 4B, 4D, 4E, having the side edges thereof bent and secured to the various ribs, as has been fully described with reference to FIGURE 3.

If desired, one or more of the butt-straps 8 can be eliminated by omitting to secure the car-body to one or more of the auxiliary protection ribs, as is for example the case with the body panel 4B and the auxiliary protection rib 1D of FIGURE 14.

In order to further increase the impact strength of the doors, the protective action exerted by the main protection ribs 1A and 1B of a door is conjugated with the protective action exerted by the corresponding ribs of the adjoining door. To this end, the lower rib 1B carries on the lower face thereof an angled bracket 23 the vertical flange of which bears, when the door is closed, against the frame 2 which provides a connection between the two doors in case one of said doors undergoes a violent shock.

The possible cooperation between the corresponding upper main protection ribs 1A is achieved as follows: the two vertical pillars 24 to which are hinged two adjoining doors are interconnected by a transverse tube 25 located as far back as possible behind the front-seat 26 (see FIGURE 13), this arrangement being possible since said seat is positioned much nearer the front of the vehicle than in an ordinary car, for reasons which have been given hereabove. Moreover, the pillar 24 is provided, on the portion against which the door bears when in closed position, with a bearing member 27 rigidly secured to the tube 25. Finally, the protection rib 1A carries, at a suitable place, an angled bracket 28 very rigidly secured thereto, the vertical flange of which abuts the bearing member 27 when the door is closed. In this way, the two adjoining doors form a triangulated unit which is substantially undistortable even under violent impacts, which solves the problem of an accidental opening of the doors as a result of distortions due to shocks.

In order to obtain an even more efficient triangulation, the upper rib 1A can be further reinforced. To this end, it is possible for example to use a rib formed, as shown in FIGURE 14, of two metal plates and to pack a lining of a light material therebetween, said material being, for example, compressed and impregnated wood.

The structure which has just been described can be further reinforced by means of reinforced metal plates disposed transversely with respect to the vehicle, as for example the plate 29A. Additionally to its main function as a side prop, this plate can be used as a bearing member for the front seat 26. Moreover, padding members, such as a suitcase 29B having a rigid bottom and a flexible top can serve as a cushioning wall for the passengers occupying the rear seats, in case they are ejected towards the front when the vehicle is suddenly slowed down.

The present invention also applies to heavy vehicles such as lorries. In the case, for example, of a truck, it is advantageously possible to apply the arrangement illustrated in FIGURES 15 and 16, the truck being provided with a protection belt secured at the level of the wheels. In the disclosed embodiment, this protection belt is formed, as already described, of two main ribs 1A and 1B and an intermediate auxiliary rib 1C secured to one another and to the frame of the vehicle by any suitable means. In front of the wheels 30, the protection belt includes a removable portion 31, which can be readily taken off to give access to the wheels. The platform 32 of the lorry is preferably rounded at the rear ends thereof, as can be seen in FIGURE 16, so as not to project beyond the protection belt.

It is to be understood that this invention has been described and illustrated merely by way of explanation and without any intention of limitation, and that various changes of detail can be made thereto without falling outside the scope of the invention.

Thus, when the invention is applied to a motor car of the types shown in FIGURES 4, 5, 6 and 10, 11, 12, the front end of the vehicle can carry a safety wheel 33 (FIGURES 10, 11 and 12) of the type described in French Patent No. 1,194,538 of 26th March, 1958 in the name of the same applicant, said safety wheel being capable of transforming a direct hit into a lateral sliding of the vehicle along the obstacle.

Likewise, due to the streamlined shape of the car bodies which can be obtained with the present invention, it can be useful, as clearly shown in FIGURES 5 and 11, to give to the rear part 1E of the protection belt a shape which will ensure a further protection of the rear wheels and of the engine which is also located at the rear.

In addition, it is obvious that the protection belt can be formed of removable members to allow a ready access to the various mechanical parts of the vehicle.

It is to be understood that the invention applies as well to vehicles having their engines at the rear and to vehicles with the engine at the front.

Finally, it is possible, without falling outside the scope of the invention, to confine the protection belt to the front part of light vehicles and to the rear part of heavy vehicles.

I claim:

1. A vehicle with a car body with at least one seat capable of withstanding shocks comprising in combination a car body shell, and a strengthening support within said car body shell comprising main ribbing surrounding the body of an occupant above seat cushion height extending substantially from the front to the rear of said car body shell, said ribbing having a wider flat surface in the horizontal plane than in the vertical plane, whereby the maximum strength of said ribbing is exerted in the horizontal plane in support of said car body shell against horizontally imposed forces.

2. A vehicle in accordance with claim 1 further characterized by said main ribbing comprising at least one auxiliary rib in a horizontal plane vertically displaced from said main ribbing.

3. The vehicle in accordance with claim 1 further characterized by a transverse rib in the forward part of the vehicle having a wider flat surface in the horizontal plane than in the vertical plane and integral with said main ribbing.

4. A vehicle with a car body with at least one seat capable of withstanding shocks comprising in combination a car body shell, and a strengthening support within said car body shell comprising a main ribbing surrounding the body of an occupant above seat cushion height extending substantially from the front to the rear of said car body shell, said main ribbing having a wider flat surface in the horizontal plane than in the vertical plane whereby the maximum strength of said ribbing is exerted in the horizontal plane in support of said car body shell against horizontally imposed forces, said main ribbing including auxiliary ribs connected with each other without a break in line of continuity for the length of said main ribbing.

5. The vehicle in accordance with claim 4 further characterized by said car body shell comprising longitudinal strips with their edges secured to at least one of said ribs.

6. The vehicle in accordance with claim 4 further including doors on the vehicle having said ribs mounted thereon whereby said doors are made undistortable.

7. A vehicle with a car body with at least one seat capable of withstanding shocks comprising in combination a car body shell, and a strengthening support within said car body shell comprising at least one main rib surrounding the body of an occupant above seat cushion height extending substantially from the front to the rear of the vehicle, said main rib having a wider flat surface in the horizontal plane than in the vertical plane whereby the maximum strength of said rib is exerted in the horizontal plane in support of said car body shell against horizontally imposed forces.

References Cited in the file of this patent

UNITED STATES PATENTS

| | | |
|---|---|---|
| D. 163,339 | Thompson | May 15, 1951 |
| 1,290,958 | Foster | Jan. 14, 1919 |
| 1,483,650 | Corbin | Feb. 12, 1924 |
| 1,608,228 | Parke et al. | Nov. 23, 1926 |
| 2,071,592 | Thompson | Feb. 23, 1937 |
| 2,084,694 | Martin | June 22, 1937 |
| 2,156,730 | Kuner | May 2, 1939 |
| 2,232,275 | Ronning | Feb. 18, 1941 |
| 2,237,369 | Seyerle | Apr. 8, 1941 |
| 2,297,198 | Borgward | Sept. 29, 1942 |
| 2,354,700 | Pezzano | Aug. 1, 1944 |
| 2,734,588 | Schlumbohm | Feb. 14, 1956 |
| 2,916,324 | Graham | Dec. 8, 1959 |
| 3,002,782 | Jahn | Oct. 3, 1961 |

FOREIGN PATENTS

| | | |
|---|---|---|
| 399,517 | Germany | Aug. 5, 1924 |
| 736,131 | Germany | June 7, 1943 |
| 562,083 | France | Aug. 23, 1923 |
| 869,822 | France | Nov. 27, 1941 |
| 1,070,577 | France | Feb. 24, 1954 |